US007242809B2

(12) United States Patent
Hunter et al.

(10) Patent No.: US 7,242,809 B2
(45) Date of Patent: Jul. 10, 2007

(54) DIGITAL VIDEO SEGMENTATION AND DYNAMIC SEGMENT LABELING

(75) Inventors: Kurt M. Hunter, Sammamish, WA (US); Ian Cameron Mercer, Sammamish, WA (US); Bret Ahlstrom, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/603,565

(22) Filed: Jun. 25, 2003

(65) Prior Publication Data

US 2005/0111824 A1    May 26, 2005

(51) Int. Cl.
  *G06K 9/62*    (2006.01)
(52) U.S. Cl. ............... 382/224; 382/173; 382/225; 375/240.16; 702/76; 386/98
(58) Field of Classification Search ............... 382/225, 382/165, 173, 243, 170, 168, 305, 236, 226, 382/171, 224; 375/240.16, 240.26, 240.15, 375/240.01; 348/700, 397.1; 704/245; 702/76, 702/16; 715/723, 720; 360/48; 386/52, 386/48, 98
See application file for complete search history.

(56) References Cited

U.S. PATENT DOCUMENTS

| 5,537,530 | A | 7/1996 | Edgar et al. |
| 6,075,875 | A | 6/2000 | Gu |
| 6,269,394 | B1 | 7/2001 | Kenner et al. |
| 6,597,859 | B1 * | 7/2003 | Leinhart et al. .......... 386/65 |
| 6,807,306 | B1 * | 10/2004 | Girgensohn et al. ........ 382/225 |
| 6,813,313 | B2 * | 11/2004 | Xu et al. ............... 375/240.08 |
| 7,016,540 | B1 * | 3/2006 | Gong et al. .................. 382/225 |
| 7,027,509 | B2 * | 4/2006 | Jun et al. ............... 375/240.16 |
| 7,072,908 | B2 | 7/2006 | Dideriksen et al. |
| 2002/0138619 | A1 | 9/2002 | Ramaley et al. |

(Continued)

FOREIGN PATENT DOCUMENTS

WO    0115169 A1    3/2001

OTHER PUBLICATIONS

Lienhart, "Automatic Text Recognition for Video Indexing," ACM Multimedia 96, 1996, pp. 11-20, U.S.A.

(Continued)

*Primary Examiner*—Sheela Chawan
(74) *Attorney, Agent, or Firm*—Senniger Powers

(57) ABSTRACT

A method and system for segmenting video into an optimal set of video clusters that correspond loosely to one or more events, date ranges, time ranges, chapters or other logical segmentations of the digital video that is meaningful to the user. Video shots are selected from one or more video files on a computer-readable medium. The video shots are arranged in chronological order and a distance (e.g., time gap) between each successive pair of the arranged video shots is determined. Video clustering are generated as function of the determined 'distances' and/or user input, and an optimal video clustering is identified. After the optimal video clustering is identified, a time span for each of the video clusters is determined and a label is generated for each cluster. The clusters are then displayed for the user to browse using the generated labels and thumbnails derived from the video clips, transferred to a separate medium for display on another computer or other electronic device (e.g. DVD-video player) or made available for the user or other software to manipulate further.

36 Claims, 9 Drawing Sheets

U.S. PATENT DOCUMENTS

2002/0172377 A1 11/2002 Dideriksen et al.
2003/0164845 A1 9/2003 Fayan et al.
2005/0081159 A1 4/2005 Gupta et al.

OTHER PUBLICATIONS

Yeo et al., "Retrieving and Visualizing," Communications of the ACM, Dec. 1997, pp. 43-52, vol. 40, No. 12, U.S.A.

Lienhart et al., "Video Abstracting," Communications of the ACM, Dec. 1997, pp. 55-62, vol. 40, No. 12, U.S.A.

Lienhart, "Abstracting Home Video Automatically," ACM Multimedia 99 (part 2), Oct. 1999, pp. 37-40, U.S.A.

Luo et al., "Designing an Interactive Tool for Video Object Segmentation and Annotation," ACM Multimedia 99, Oct. 1999, pp. 265-269, U.S.A.

Girgensohn et al., "A Semi-automatic Approach to Home Video Editing," UIST 00, 2000, pp. 81-89, CHI Letters vol. 2, 2, U.S.A.

\* cited by examiner

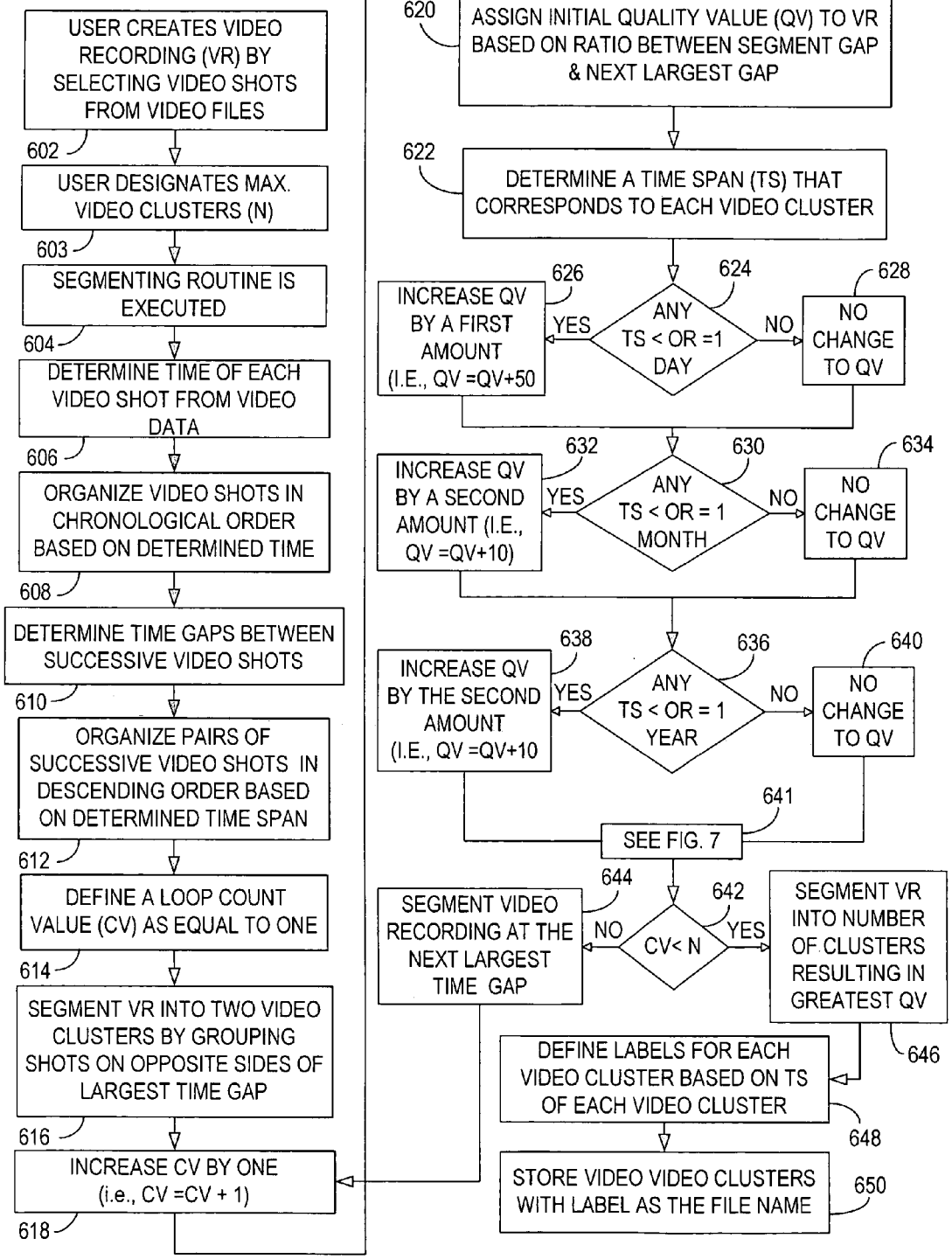

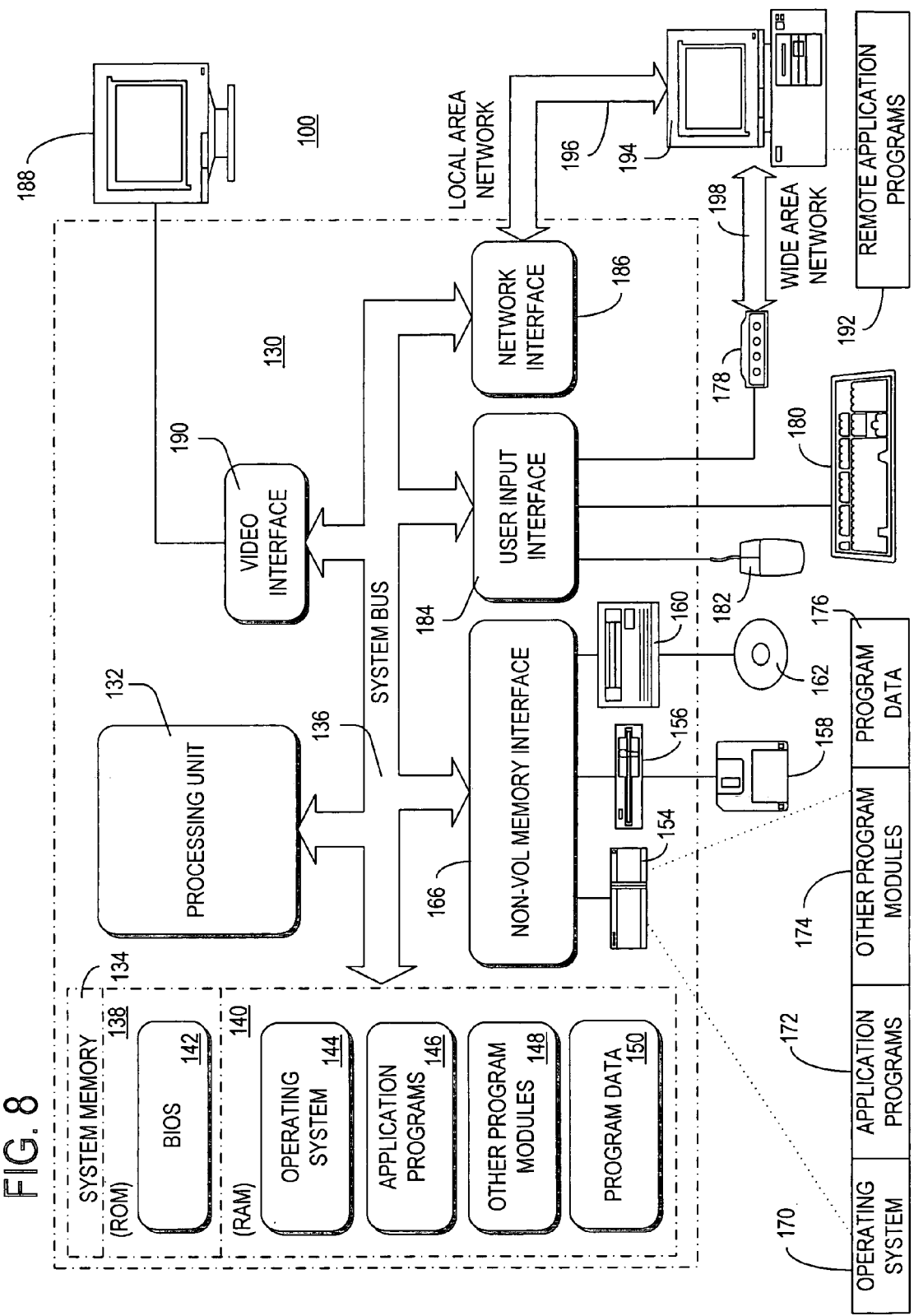

DIGITAL VIDEO SEGMENTATION AND DYNAMIC SEGMENT LABELING

TECHNICAL FIELD

The present invention relates to the fields of digital video segmentation and image and video clustering. Specifically, the present invention pertains to the automatic segmentation of digital video files into one or more video clusters corresponding to specific events, date ranges, time ranges, chapters or any other logical ways to segment digital video files, each cluster comprising of one or more video shots. The invention also pertains to clustering still images and to clustering mixed collections of still images and digital video.

BACKGROUND OF THE INVENTION

An increasing number of people own and use camcorders to make videos that capture their experiences and document events in their lives. One of the primary problems with consumer home video acquisition devices such as camcorders is that they are linear tape based devices and a single tape may contain multiple "events" (e.g. birthday party, soccer game, vacation video, etc.). Each event may in turn consist of multiple "shots" (i.e. the sequence of contiguous video frames between the time when the camera is instructed to start recording and when it instructed to stop recording). Unfortunately, the linear nature of the videotape often makes it difficult to find and play back a segment of the video showing a specific event.

Multimedia editing applications (MEA) allow users to bring versatility to such linear video recordings via their personal computer by allowing the user to capture or transfer the video from their videotape onto their computer and then to manually segment the digital video file into events of their choosing. Some MEAs make this easier for the user by automatically segmenting the video file into shots displayed in a library and then allowing the user to manually select shots and combine them to form events of their choosing. MEAs that automatically segment video into shots typically do so by analyzing the time of day recorded with each frame on a Digital Video (DV) camera to find discontinuities, or by analyzing the image content of each frame recorded by an analog camera using color histograms or other image analysis techniques, or by simply segmenting the video at fixed time intervals (e.g. every 15 seconds).

Unfortunately, existing MEAs provide little or no assistance if the user wants to browse the digital video file at an intermediate segmentation somewhere below the entire tape or video library, or somewhere above the individual shots. At best, existing MEAs might group items within a tape or video library by day, month, or year, but such grouping is relatively unintelligent. For example, a video file containing a video recording of a New Year's party spanning the period Dec. 31, 2002 to Jan. 1, 2003 would likely be split over two days, over two months and over two years depending on the view selected, whereas such a video recording really documents one event to the user. Furthermore, existing MEA segmentation is often too granular (too many segments) or too coarse (too few segments). For instance, a tape viewed 'by day' might contain 27 separate days, whereas this may correspond to three vacations to the user, each lasting between one and two weeks. Another tape might have been recorded entirely on a single day and thus show only one segment when viewed 'by day' but to the user it is really two separate events, one in the morning and one in the afternoon.

To obtain a meaningful segmentation of the digital video file, the user must undergo a lengthy and tedious process to either split the entire digital video file into segments manually or combine shots to form desired segments. Furthermore, such user-initiated segmentation creates a static segmentation of the digital video file and it is hard to create a more granular (more segments) or less granular (less segments) view of the digital video file without starting over.

When an MEA is used to create an optical video disc (e.g. DVD-video disc, VCD video disc, etc.) the user will typically create chapters within the digital video file allowing other people viewing the disc to navigate quickly to a relevant section. Creating chapters is similar to the segmentation process described above but further complicated by the fact that certain segmentations are not desirable segmentations given the limitations of DVD-video menu navigation. For instance, typically each page in a DVD-video menu has up to six (6) items on it (any more and the icons become too small to see easily across the room), a segmentation with seven (7) segments is a undesirable segmentation because it leaves a 'hanging chapter' orphaned on a separate menu page. A better segmentation might be one with six (6) segments or twelve (12) segments because they result in full menu pages. There is, however, no simple rule that can be applied because a segmentation of 7 segments may be the only logical segmentation of the video (e.g. a tape consisting of 10 minute shots recorded one each day for a week, starting at 8 AM each morning can only sensibly be segmented into 7 segments).

Similar considerations apply when browsing the digital video file (or a library consisting of multiple digital video files) on a computer screen either within an MEA or using a Multimedia Browser (MB) such as Internet Explorer® offered by Microsoft, Inc. For any given display resolution and window size there is an optimal segmentation of the digital video file that creates an optimal number of segments based on the number of segments that can be displayed and the optimal selection of segments from the digital video file. Again, there is no easy rule for deciding this and in some cases it may be appropriate to list all segments even if the user then needs to scroll the display to see some of them.

In some cases, even if a perfect segmentation can be found, users may still want to force more segments or fewer segments to be used for personal preference reasons. When a static segmentation of the digital video file has been created by the user it is impossible to easily move to a more granular (more segments) or less granular (less segments) clustering of the video.

Still images taken using Digital Still Cameras (DSC) also have dates and times associated with them and can be clustered on a computer display or on an optical disc in a similar fashion. Mixed collections of still images and video shots can also be clustered. For example, a user might use a Multimedia Browser to view a 'birthday' event consisting of video shots and still images taken at a birthday party.

For these reasons, a system for automatically creating the optimal clustering of video shots and/or still images (collectively Media Elements (ME)) for browsing, disc creation or other manipulation is desired. Such a system needs to consider the shots within the digital video file itself, the times associated with each video shot or still image, the means by which the clusters will be presented to the user (e.g. in a menu on an optical disc like DVD-video, or in a browseable library on a computer) and user input in determining how many clusters to create and precisely how to allocate video shots and still images to clusters.

Similar issues exist when a user is dealing with any other collection of objects occurring at known times, for example presentation and word processing documents. As used herein Media Elements refers to video shots, still images, audio clips or any other collection of objects having known start times and optionally a known duration or end-time.

SUMMARY OF THE INVENTION

In accordance with one aspect of the invention, a computer-readable medium includes executable instructions for segmenting a plurality of video shots within one or more video files. Determining instructions determine a time corresponding to each video shot. Organizing instructions organize video shots into a sequence according to the time determined to correspond to each video shot. Determining instructions determine a time gap between two successive shots in the organized sequence. Segmenting instructions group the video shots of the video file into a sequence of potential clusterings, each potential clustering comprising of a plurality of video clusters selected as a function of the determined time gaps.

In accordance with another aspect of the invention, quality instructions evaluate each potential clustering and assign it a quality value as a function of the time gaps within clusters and the time gaps remaining between clusters within the potential clustering. The method further includes the application of date and time based criteria to the time gaps within clusters in order to further refine the quality value.

In accordance with another aspect of the invention, selection instructions examine the quality value associated with each potential clustering to select the best appropriate clustering for each situation.

In accordance with another aspect of the invention, labeling instructions determine a label for each cluster within a given potential clustering based on the time span that corresponds to the cluster of video shots within the cluster and the time span associated with each other cluster within the potential clustering.

In accordance with another aspect of the invention, storage instructions store the selected clustering on a computer-readable medium as a file or as a series of files with associated menus and metadata. The storage instructions create a single file or a series of files that include a sequence of groups of video shots together with metadata about each video shot and the determined label. Storage labeling instructions may also use the determined label as the name of the created file.

In accordance with another aspect of the invention, display instructions display the selected potential clustering while a User interface allows the user to manipulate the displayed clusters further to display other potential clusterings or to further subdivide one cluster into a new sub-potential clustering; or to combine a plurality of clusters within a potential clustering to form a new single cluster.

Alternatively, the invention may comprise various other methods and apparatuses.

Other features will be in part apparent and in part pointed out hereinafter.

BRIEF DESCRIPTION OF THE DRAWINGS

FIG. 6 is an exemplary flow chart illustrating one preferred embodiment of operation of the MEA according to the invention.

FIG. 8 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
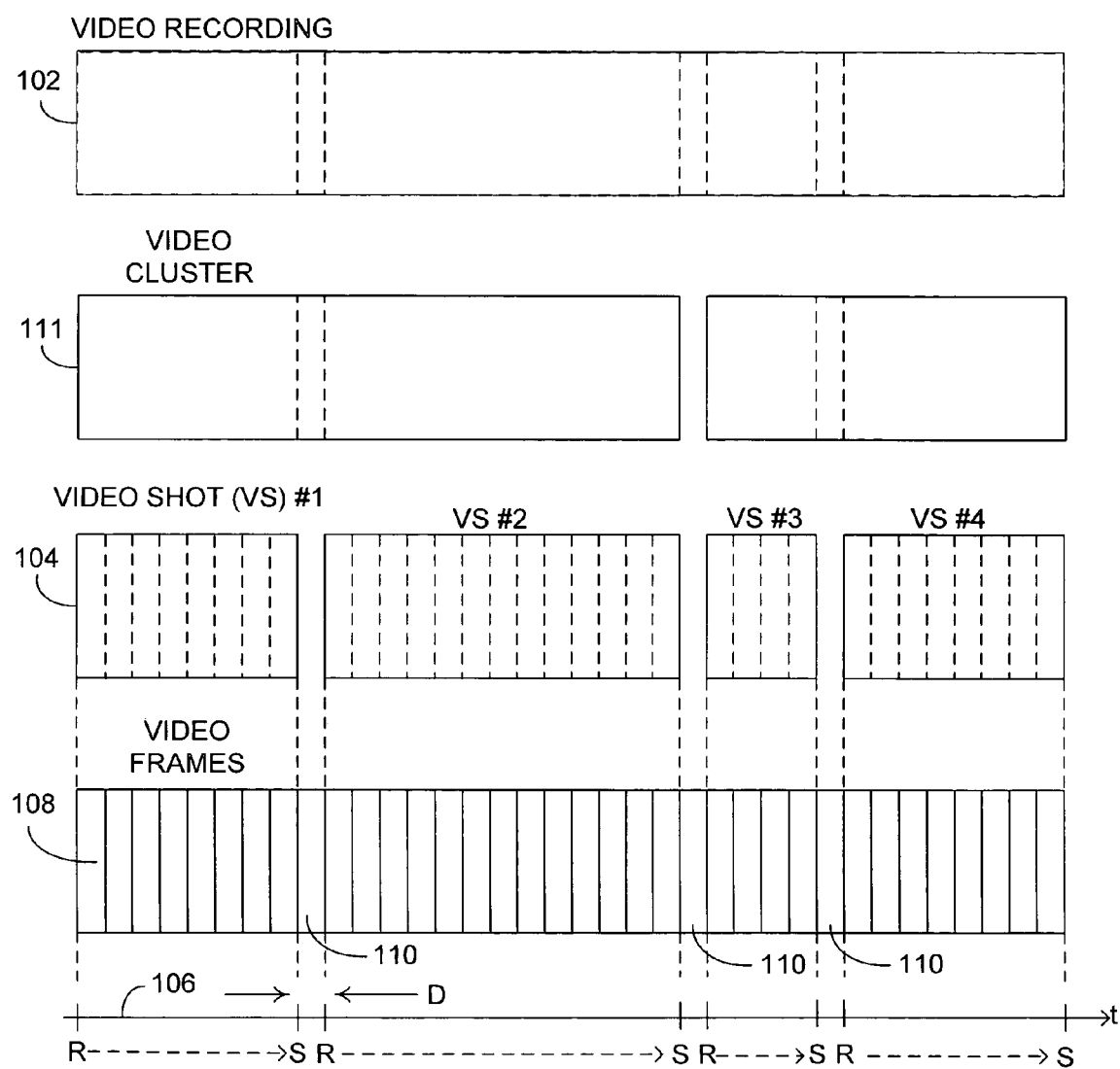
FIG. 1 is an exemplary block diagram illustrating one preferred embodiment of three levels of a digital video file.

Referring first to FIG. 1, an exemplary block diagram illustrates three fundamental levels of a digital video file 102 or a digital video library consisting of multiple video files 102. At a fundamental or base level, video file 102 comprises multiple frames 108, each frame typically having a fixed duration D and a known date and time at which it began recording. As known to those skilled in the art, the duration of a video frame is typically a small fraction of one second (e.g., $\frac{1}{30}$, $\frac{1}{25}$ or $\frac{1}{24}$) but may be any other value or may vary from frame to frame within a single video file.

At the next higher level, digital video file 102 comprises multiple video shots 104 including one or more video frames 108. As shown by timeline 106, each video shot 104 represents a continuously recorded portion of the digital video file 102 between a record operation R and a stop operation S of the recording device. Within video shot 104, each video frame 108 after the first video frame 108 in the shot has a start date and time equal to the start date and time of the previous video frame plus the duration D of the previous video frame. As known to those skilled in the art, the difference between the last frame of one shot and the first frame of the next shot is always greater than the duration of a single frame. It may be a few seconds or it may be several minutes, hours or even days or months away, typically corresponding to the time between the user pressing stop on a camcorder and the next time they start recording.

At the next higher level within the hierarchy, digital video file 102 can be grouped or segmented into clusters 111. Because there is no fixed determination of how video clusters 111 are defined, there are many possible alternate clusterings that can be made at this level. Some clusterings form a hierarchy (e.g. day, month year), while some are independent of each other (e.g. month, event). Video clusters 111 comprise multiple video shots 104 representing a meaningful subdivision of the video file 102 (or video library) to the end user. For example, a video cluster might represent a birthday party, or a soccer game recorded as a sequence of video shots 104 spanning a few hours, or it might represent an entire vacation spanning multiple days, or even an entire month or year of video. There exists multiple ways to create video clusters 111 for any given plurality of video shots 104. Some of these arrangements of video clusters 111 are considered desirable or preferable by the end user while others may be less preferable, less desirable, or undesirable. A desirable clustering is one that corresponds closely to a user's mental model of what is represented in the video file 102. For example, the video cluster VC#1 depicted in Potential Clustering #1 112 might include all video shots 104 belonging to a single birthday party (VS#1, VS#2) and might therefore represent a desirable clustering of video shots 104, while the cluster VC#1 in Potential Clustering #2 114 might be an undesirable clustering if it included the birthday party recording (VS#1, VS#2) and the first half of a soccer match (VS#3).

Figure 2:
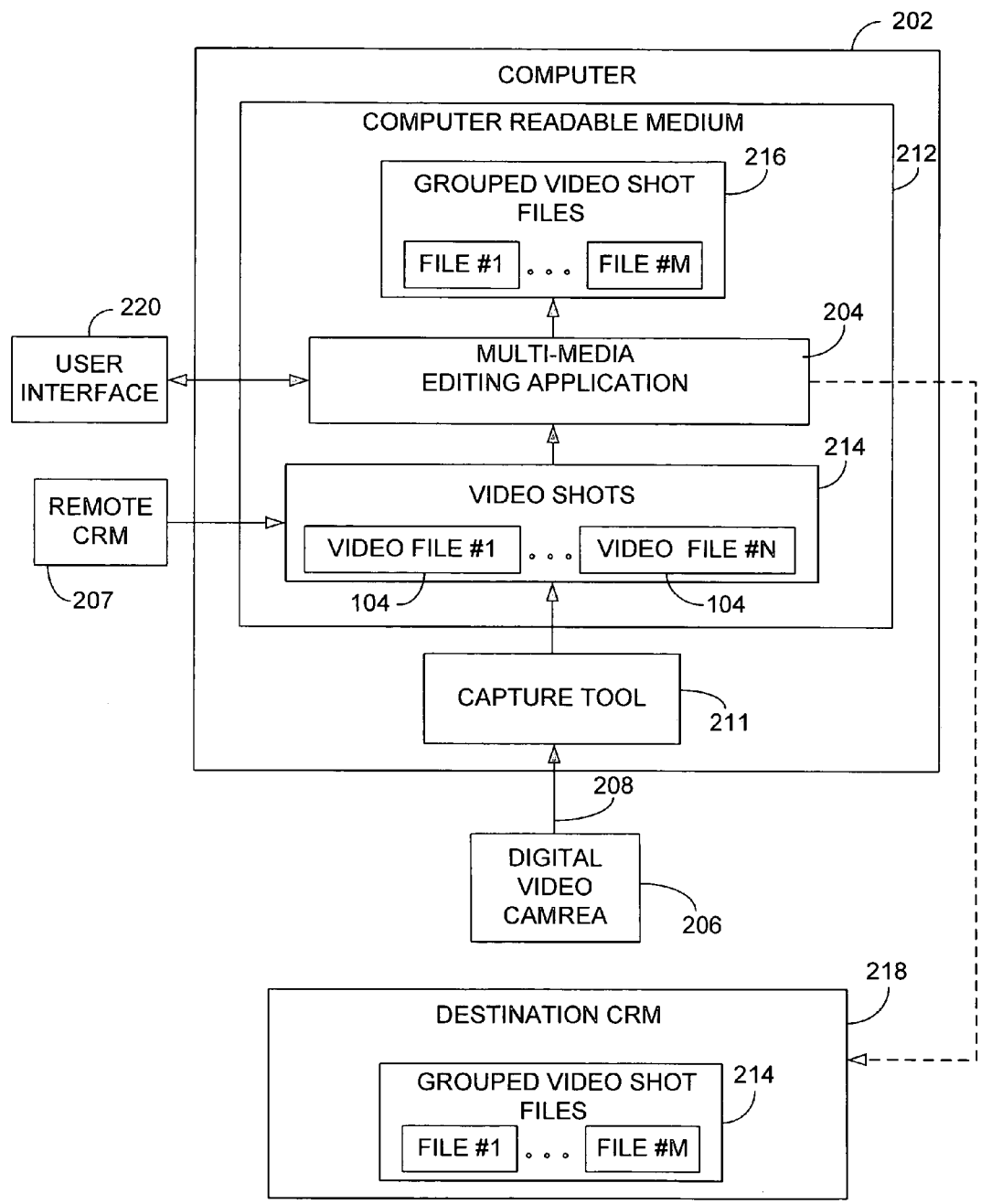
FIG. 2 is an exemplary block diagram illustrating one preferred embodiment of a computer comprising an MEA according to the invention for segmenting video shots and for storing the segmented video shots on a computer-readable medium linked to the computer.

Referring now to FIG. 2, an exemplary block diagram illustrates a computer 202 comprising a multimedia editing application (MEA) 204 for performing various video editing functions including grouping or segmenting video shots 104 stored within one or more video files 214. A video source such as a digital video camera 206 or a remote computer-readable medium (CRM) 207 can generate the digital video file 102 containing video shots and/or other media elements (e.g., still shots). The MEA 204 organizes video shots 104 and/or other media elements dynamically or statically into separate clusters for the purposes of display through a user interface 220 or for subsequent output onto another CRM such as to a Digital Video (DV) tape linked to the computer. For example, the DV tape may be an optical video disc with chapters such as a DVD-video disc.

The digital video camera 206 records a visual image or series of visual images and generates a digital video stream 208 representative of the visual image or series of visual images. The digital video stream 208 includes video data specifying the start time and date of the individual video images or "video frames" included in the video stream 208. As described in more detail in reference to FIG. 4 below, the time and date of the recording can be stored as video data in each frame of a video shot 104 recorded with a digital video camera 206.

The remote CRM 207 can be any CRM storing video shots that can be linked to the computer 202 for the purpose of transferring or importing the stored video shots to a CRM 212 of the computer 202. For example, the remote CRM 207 can be an optical disc in a DVD-drive, another computer, a personal video recorder (PVR), or any other video capable device which can be linked to the computer 202 via a network (e.g. Ethernet) or direct connection (e.g. USB) such that video shots stored on the remote CRM can be transferred to the computer 202 via electronic means such as file transfer or electronic mail.

A capture tool 211 is linked to the computer 202 and the digital video camera 206 for capturing the digital video stream 208. The capture tool 211 transfers the digital data directly to the CRM 212 of the computer 202 (e.g., hard drive or random access memory (RAM)) for storage as a video shot file 214 containing, for example, DV data. Alternatively, the capture tool 211 may convert the format of digital video stream 208 from one digital video format to another during capture. For example, the capture tool 211 may convert the format of the digital video stream 208 from DV data to Windows Media Video (WMV) while preserving the date and time information about each shot from the original file. The capture tool 211 may change the timing or the number of frames present within the digital video stream. For example, the capture tool 211 may convert the frame rate of the digital video steam 208 to a different frame rate while preserving the start time for each new frame created and calculating a new duration for each frame. The capture tool 211 may be implemented using software that writes DV-AVI files together with a direct connection such as an Institute of Electrical and Electronic Engineers (IEEE) 1394 interface. The IEEE-1394 interface can be connected to an IEEE-1394 connection port on a digital camcorder and connected to an IEEE-1394 connection port on the computer 202 to facilitate transfer of the digital video stream 208, generated by digital video camera 206, to the computer 202 for storage.

Although the capture tool 211 is described as capturing a video stream 208, it is contemplated that audio information (i.e., audio stream) that corresponds to a particular video shot 104 can also be captured. Thus, as used herein, the discussion relating to video is applicable to both video and audio information.

An MEA 204 such as Windows® Movie Maker editing software offered by Microsoft, Inc. allows a user to archive video recordings recorded on video tapes for storage in a digital format. The MEA 204 of the invention further allows a user to view a single tape, an entire library of video tapes, other video files, and/or still images as clusters. Thus, the user can locate a specific cluster, shot or frame of video from the entire video file or video library present on the computer 202 or the remote CRM 207.

The MEA 204 of the invention further allows the user to manipulate clusters to view alternate clusterings of the video shots and/or still images within the digital video shot files 214. For example, the user can view alternate clusterings based on the time span of the clusters (e.g., day, month or year), or can view an optimal set of clusters based on the screen resolution and window size. The MEA 204 of the invention further allows the user to increase or decrease the granularity of the clusters displayed, either as a whole or for a selected set of clusters. For example, the user might select the first cluster and request that it be broken down or subdivided into smaller clusters, or the user might not select any clusters and simply request to see fewer clusters overall (e.g., combine clusters). Alternatively, the user might split a single cluster that represents an event like a wedding into two new clusters, one representing the church service and one representing the wedding reception. The MEA 204 of the invention further allows a user to attach metadata to each video shot or image within a cluster by naming the cluster that has been generated. For example, the user can tag each shot in the aforementioned example with "Wedding reception" as a label for display or later search operations. The MEA 204 of the invention further allows a user to create one or more new video files locally, on CRM 212, or on a destination CRM based on a clustering designated by the user or based on an automatic clustering created without user input. For example, the MEA can create a set of new video files, with each cluster forming a separate file. In another example, the MEA might create a DVD-video disc with a single video file together with a menu listing chapters within that file based on the clusters. In another example, the MEA might create a new video file with video titles inserted between each cluster stating the start time and date (or the time and date range) of the following cluster, or stating a user entered name for that cluster (e.g. "Hawaii Vacation"). In another example, the MEA might add a subtitle to each video frame, or to the first few seconds of video in each cluster showing the starting time and date of the cluster, or a user-entered name for that cluster.

The MEA 204 provides a user interface 220 for controlling the clustering process. Typically the computer using the MEA of this invention creates an initial automatic clustering. The user then has the option to refine the clustering by reducing the number of clusters overall, increasing the number of clusters overall, increasing the number of clusters within a selected cluster or clusters, or decreasing the number of clusters within a selected set of clusters. The MEA 204 may also provide a user interface 220 for saving the results to a removable CRM (i.e., destination CRM 218) such as an optical video disc (e.g. a DVD-video disc) with options to create chapters based on the currently displayed set of clusters, or based on a fully automatic clustering process optimized for the ideal menu structure of the optical video disc. The MEA 204 may also provide a user interface 220 for saving the results to a new video file with video titles (short video segments with text displayed showing the name and time/date information for the segment, e.g. "Hawaii Vacation Jun. 24-27, 2002".

The MEA 204 may also provide a user interface 220 for saving the results to a new video file with video subtitles showing the name and time/date information for the segment. For example, "Hawaii Vacation Jun. 24-27, 2002" might be superimposed on the video as a subtitle down the bottom of the video image using a sub-picture-titling feature on a DVD-video disc. During playback of the disc the user can chose to turn the subtitle on or off. Alternatively the subtitle may be 'burned into' the original so that it is always displayed. In this case, the subtitle might only be added during the first few seconds of each cluster so that it appears whenever a new event starts on the tape but then disappears so as not to be distracting.

The MEA 204 may also provide a user interface 220 for saving the results to a CRM as a new arrangement of the original files, for example, with one directory for each cluster. This might be used by a user to sort a large collection of digital still images into folders with one folder for each event.

Figure 3:
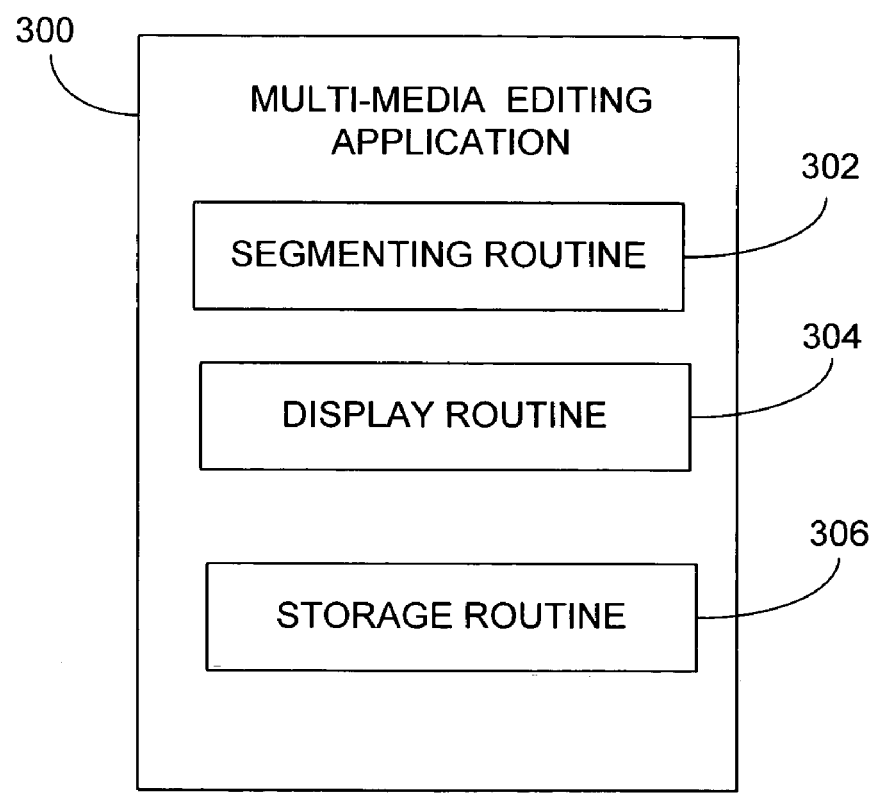
FIG. 3 is an exemplary block diagram illustrating one preferred embodiment of components of an MEA for implementing the invention.

Referring now to FIG. 3, an exemplary block diagram illustrates basic components of an MEA 300 for implementing the invention. In this example, the basic components of the MEA 300 include a segmenting routine 302, a display routine 304, a storage routine 306. The segmenting routine 302 includes a set of computer executable instructions for segmenting video shots and/or still images within a digital video file. The display routine 304 includes a set of computer executable instructions for displaying the results of the segmenting routine 302 and for interacting with the user to allow the user to interactively modify the segments that have been created. The storage routine 306 includes a set of computer executable instructions for changing the file system on a CRM including operations such as creating new directories, moving files from one location to another. The storage routine 306 also includes a set of computer executable instructions for creating new video files based on the results of the segmenting routine including instructions for copying one or more video segments into a new file, and instructions for adding titles and subtitles to the video within the digital video file. The storage routine 306 further includes a set of computer executable instructions for writing chapters to a CRM based on the results of the segmenting routine together with the video or image files that exist within those chapters.

Figure 4:
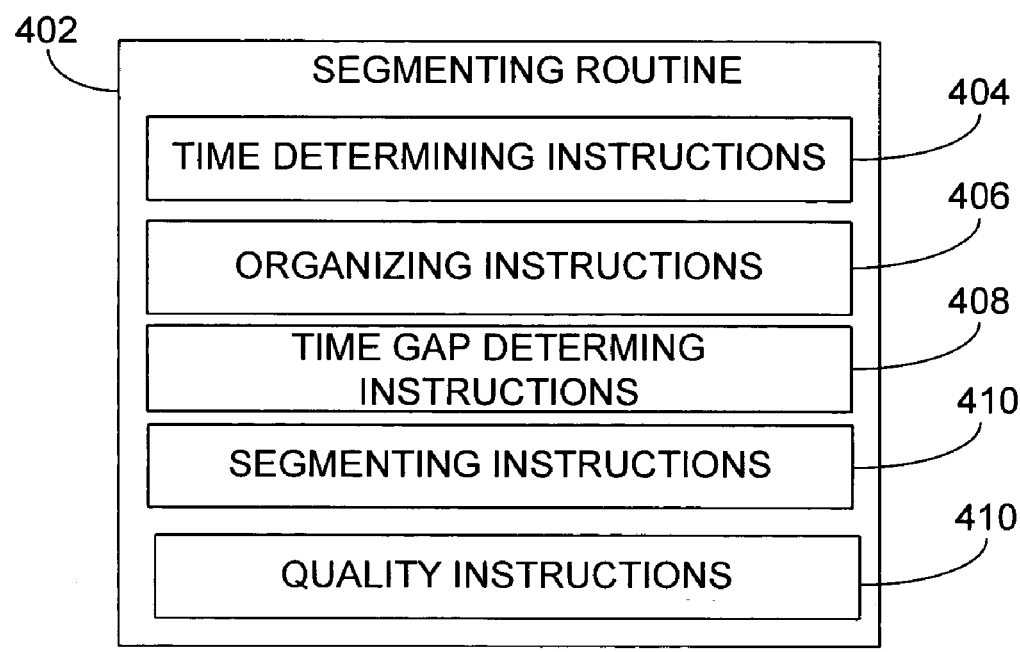
FIG. 4 is an exemplary block diagram illustrating one preferred embodiment of the contents of a segmenting routine comprising computer executable instructions for segmenting video shots according to the invention.

Referring next to FIG. 4, an exemplary block diagram illustrates the contents of a segmenting routine 402 comprising computer executable instructions for grouping mixed collections of media elements (i.e., video shots and/or still images) within a digital video file into video clusters.

Time determining instructions 404 include instructions for determining a start and end time corresponding to each media element. As used herein, determining a start and end time includes determining a start time and date and an end time and date of a particular video shot from time and date information included within the video shot.

In the case of a video shot recorded by a digital video source, the time and date for each frame can be stored as video data in the video shot file such as a Digital Video (DV) formatted file. Accordingly, the start and end times can be easily determined by examining the first and last frame in the video shot and extracting the time and date information present in the Digital Video (DV) formatted file. For still images generated, for example, by a Digital Still Camera (DSC), the date and time that the picture was generated is typically stored in EXIF metadata present in the JPEG file. For the purposes of this invention, the start and end times for a still image are set to the same value. Essentially, a still image is treated as a video shot with a duration of zero seconds. For other media elements the time and date it was created or the time and date it last modified (depending on the application) is used for both the start and end times. In the event the time and date cannot be determined for a media element, the user can designate start and end times and dates for the media element.

Time determining instructions 404 include instructions for segregating media elements for which start and end times can not be determined. For example, in the event time and date cannot be determined for a media element, and no time and date is designated by the user, all such media elements are segregated into a separate cluster apart from the clusters for all video shots and still images for which the time and date were successfully determined.

Organizing instructions 406 include instructions for organizing media elements in a sequence based on the determined start and end times of each of the media elements. Referring now to Table 1, six video shots which are part of a digital video file 102 are designated by a user and their corresponding determined times are shown. Although the invention can be used for grouping or segmenting various media elements, for purposes of illustration the invention is described below in connection with the grouping or segmenting of a plurality video shots.

TABLE 1

| VIDEO SHOT (VS) | START TIME & DATE | END TIME & DATE |
| --- | --- | --- |
| VS1 | 12:30:00, Jan. 31, 2002 | 12:35:00, Jan. 31, 2002 |
| VS2 | 07:00:00, Jan. 2, 2002 | 07:05:00, Jan. 2, 2002 |
| VS3 | 00:30:00, Jan. 1, 2002 | 00:37:00, Jan. 1, 2002 |
| VS4 | 16:00:00, Jan. 1, 2002 | 16:10:00, Jan. 1, 2002 |
| VS5 | 23:30:00, Dec. 31, 2001 | 23:55:00, Dec. 31, 2001 |
| VS6 | 18:00:00, Feb. 2, 2002 | 19:00:00, Feb. 2, 2002 |

Organizing instructions 406 arrange the media elements in chronological order based on the determined start time of each media element. For example, from video shot data in Table 1, the video shots can be listed in chronological order as shown below in Table 2.

TABLE 2

| C1<br>VIDEO SHOT<br>(VS) | | C2<br>START TIME & DATE | C3<br>END TIME & DATE |
|---|---|---|---|
| R1 | VS5 | 23:30:00, Dec. 31, 2001 | 23:55:00, Dec. 31, 2001 |
| R2 | VS3 | 00:30:00, Jan. 1, 2002 | 00:37:00, Jan. 1, 2002 |
| R3 | VS4 | 16:00:00, Jan. 1, 2002 | 16:10:00, Jan. 1, 2002 |
| R4 | VS2 | 07:00:00, Jan. 2, 2002 | 07:05:00, Jan. 2, 2002 |
| R5 | VS1 | 12:00:00, Jan. 31, 2002 | 12:35:00, Jan. 31, 2002 |
| R6 | VS6 | 12:00:00, Feb. 2, 2002 | 19:00:00, Feb. 2, 2002 |

Time gap determining instructions 408 determine a time gap between two successive media elements in the organized sequence. Generally, there are time discontinuities or "time gaps" between successive media elements. (See FIG. 1). In this case, the time gap corresponds to the time between the successive video shots, i.e. the difference between the end time of one shot and the start time of the subsequent shot. For example, the time and date that corresponds to the end of VS5 is 23:55:00, Dec. 31, 2001 (i.e., see cell located at R1 and C3 in Table 2; hereinafter referred to as R1C3). The time and date that corresponds to the start of the subsequent video shot VS3 is 00:30:00, Jan. 1, 2002 (see R2C2 in Table 2). Thus, the time gap determining instructions 408 determine a time gap of 35 minutes, or 0.024 days, between successive shots VS5 and VS3.

In the event the media elements overlap in time, the time gaps is taken to be zero. For example, consider a still picture taken while a camcorder is recording a video shot would have a time gap of zero. In this case, the time gap determining instructions 408 would determine the time gap between the video shot and the still image to be zero.

The calculated time differences are then sorted largest first:

TABLE 3

| | C1<br>SHOTS | C2<br>TIME GAP |
|---|---|---|
| R1 | VS2 and VS1 | 29.204 days |
| R2 | VS1 and VS6 | 1.416 days |
| R3 | VS3 and VS4 | .641 days |
| R4 | VS4 and VS2 | .618 days |
| R5 | VS5 and VS3 | .024 days |

Two shots recorded closely in time (i.e., separated by a relatively small time gap) are more likely to belong to the same event. In contrast, shots that are not close in time (i.e., separated by a large time gap) are less likely to show the same event. For example, referring to Table 3, the 29.204 day gap between successive shots VS2 and VS1 indicates that it is unlikely that VS2 and VS1 correspond to the same event. As another example, the relatively small 0.024 day gap between successive shots VS5 and VS3 indicates it is likely that VS3 and VS5 correspond to the same event.

Segments are created from the video shots by starting with the largest gap, splitting the video shots on either side of it to form clusters, then taking the next largest gap, splitting the video shots on either side of it to form clusters, and so on until all the video shots that are separated by a non-zero time gap between have been split into individual clusters.

Figure 4A:
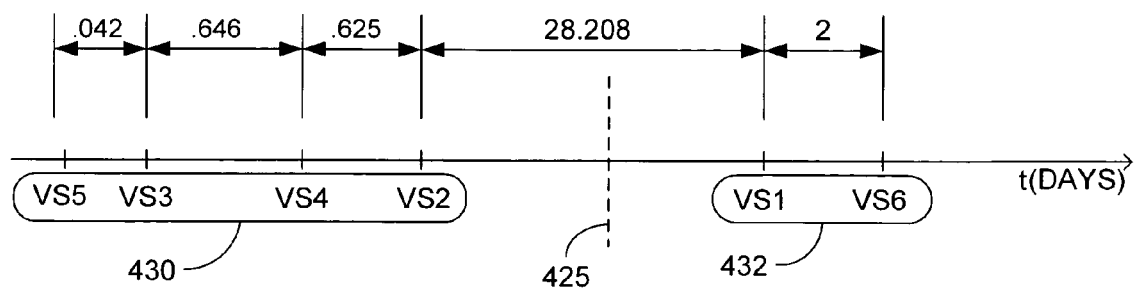
FIG. 4A illustrates the segmentation of example video shots into video clusters according to the invention.

The segmenting instructions 410 can create any desired number of clusters by splitting the video shots repeatedly between each gap listed in the Table 3, beginning with the largest gap first. For example, for V1-V6 of Table 3 to create three clusters the media elements would be split first between VS2 and VS1 and then between VS1 and VS6. (See FIG. 4A). For instance, to create three video clusters, the segmenting instructions 410 first segments the video shots between VS2 and VS1, as indicated by reference character 425 in FIG. 4A, because the largest gap (i.e., 29.204 days) is between VS2 and VS1 (R1C2 in Table 3. Next, segmenting instructions 410 segments the video shots between VS1 and VS6, as indicated by reference character 435 in FIG. 4A, because the next largest gap (i.e., 1.416 days) is between VS1 and VS6 (R1C3 in Table 3). In this example, the segmenting instructions 410 segments the designated video shots into a first video cluster 440 including video shots VS5, VS3, VS4, and VS2, a second video cluster 442 including video shot VS2, and a third video cluster 444 including video shot VS6.

The segmenting instructions 410 determine the ideal number of clusters, and, thus, when to stop splitting clusters to form new clusters by examining the ratio between a gap and the following gap. A large ratio in gap sizes indicates a good place to stop segmentation. A small ratio in gap sizes indicates a poor place to stop segmentation. In its simplest form, the invention uses the ratio in gap sizes as the sole 'Quality' measure for a given clustering. For example, stopping after the 0.641 day gap between VS3 and VS4 (R3C2 in Table 3) is not a good place to stop because the following 0.618 day gap between VS4 and VS2 (R4C2 in Table 3) is a very similar size. The Quality measure of such a clustering is low because the ratio between the chosen gap and the next gap is close to 1. (i.e., 0.641/0.618=1.03). By using the ratio between consecutive gap sizes as the 'Quality' measure the invention works for any kind of media elements no matter how far apart in time or how close together. For example, it works for a digital video file containing video recorded over the course of an entire year, or for digital video file containing a single video shot during the course of one afternoon. In either case the invention will find the optimal way to segment the digital video file into the optimal number of clusters, each containing the optimal set of video shots.

The segmenting instructions 410 may also include instructions for accepting a request to generate more or less clusters based on the current clustering. For example, the segmenting instructions 410 are responsive to a minimum and/or a maximum number of clusters designated by the user via the user interface.

Alternatively, the segmenting instructions 410 may select the ideal number of clusters by further looking for a local maximum in the 'Quality' measure for each possible number of clusters between a given minimum number of clusters and a given maximum number of clusters chosen by the calling routine or the user. For example, if the possible number of clusters is equal to three (3), the segmenting instructions 410 first segments the video shots into two video clusters, and the 'Quality' measure of two video cluster segment is determined by comparing the minimum gap in the cluster to the next largest gap. The segmenting instructions 410 then segments the video shots into three clusters, and the 'Quality' measure of the three video cluster segment is determined by comparing the minimum gap in the cluster to the next largest gap. The segmenting instructions 410 compares the Quality' measure of the two cluster segment to the Quality measure of the three cluster segment and selects the clustering with the highest Quality' measure. For example, if three clusters has a higher Quality' measure, the user is presented with the video shots broken down into three clusters.

The segmenting instructions 410 may further refine the Quality' measure by adding various values to the Quality measure as follows:

i. If no cluster crosses a date boundary (i.e., midnight), excluding clusters that are wholly contained within the date range December 31 to January 1, add 50.
  ii. If no cluster crosses a calendar month boundary, excluding clusters that are wholly contained within the date range December 24 to January 1, add 10
  iii. If no cluster crosses a calendar year boundary, excluding clusters that are wholly contained within the range December 24 to January 1, add 10

These additional values serve to bias the results towards clusters in which all the media elements are contained within a day, a month or a year. Clusters that span the Christmas and New Year's holidays and New Year's Eve in particular are exempted from this process as they represent a special case of an event that always spans a date boundary and a month and year boundary. Other specific national holidays may be added as exemptions for particular regional implementations of the invention if they span a day, month or year boundary. Moreover, additional factors may be added by specific implementations to further refine the clusters found, for example a bias towards clusters that result in a seasonal split of the media elements: Spring, Summer, Autumn, Winter; or a bias towards clusters that correspond to school semesters and vacation dates.

The quality instructions 412 can designate default values for clusters. For example, a clustering having only one (1) cluster can be defined to have a default Quality' measure such as five (5) allowing it to be compared to all other possible clusterings. Notably, in some cases a single cluster containing all media elements is the optimal result, for example if all the media elements are spaced equally in time.

In one embodiment, the segmenting instructions 412 bias the result toward certain preferred cluster counts by implementing a Cluster Count Bias. The Cluster Count Bias function takes a number of clusters, C, as input and returns a bias value that is applied to the calculated Quality measure for any given set of clusters as determined by the segmenting instructions 410. One example of a Cluster Bias function would be a function that returns C*10 if C is less than or equal to 50 while returning C if C is more than 50. A function like this biases the segmenting instructions 412 to return as many clusters as possible up to a soft limit of 50 clusters. Beyond 50 clusters the quality of the clustering needs to be about 10 times better to be chosen by the segmenting instructions as the best clustering.

An alternate Cluster Count Bias function might take a number of clusters, C as input and return zero if C is more than 12 or the appropriate bias value listed below in Table 4 indexed on the value of C.

TABLE 4

|  | C1 | C2 | C3 | C4 | C5 | C6 | C7 | C8 | C9 | C10 | C11 | C12 | C13 |
|---|---|---|---|---|---|---|---|---|---|---|---|---|---|
| R1 Bias Value | 1 | 2 | 3 | 4 | 8 | 10 | 1 | 2 | 3 | 4 | 8 | 10 | 0 |
| R2 Clusters (C) | 1 | 2 | 3 | 4 | 5 | 6 | 7 | 8 | 9 | 10 | 11 | 12 | >12 |

For example, if C equals 5 then the function returns a value of 8. This biases the invention to return a result with 6 or 12 clusters if possible, 5 or 11 clusters being the next best alternative and so on. A clustering with only two clusters has a bias value of 2 (see R1C2 in Table 4), and a clustering with six clusters has a bias value of 10. Thus, a clustering of two clusters needs to have a Quality measure that is a factor of 5 times better than a clustering of 6 clusters before it will be selected. In this instance, the Cluster Count Bias function bias the clustering towards a result which matches the chapters for a DVD menu which typically displays 6 chapters per screen. As can be seen from Table 4, seven (7) clusters is a particularly undesirable (i.e., bias value=1) because such a clustering leaves an 'orphaned' menu item on a separate menu page.

The following algorithm can be used to determine the Quality values for each possible clustering of a set of media elements:

```
{
For group count c = 1 to m (50) calculate the quality of the group Group
count = c with maximum IMAGINE score
If the user chooses more or less groups, choose the next-best score
(not just c+1 or c-1 groups)
}
int IMAGINE(int c /* cluster count */)
{
If (c == 1) then return 50
Else
{
    i. int score = (minimum gap between clusters)/(maximum gap in
       any cluster)
    ii. If (no cluster crosses a date boundary) score += 50
    iii. If (no cluster crosses a month boundary) score += 10
    iv. If (no cluster crosses a year boundary, excluding clusters that
        are wholly contained in the range Dec 24 to Jan 1) score +=
        10
    v. Score *= 10; /* biases only against c == 1 case. All other
       groupings receive equal weighting */
    vi. return score;
}
}
where m = maximum number of video clusters.
```

Alternatively, the quality of the clustering may be determined by the target storage medium. For example, if video clusters are targeted for storage on a DVD as chapters, a video file that can be segmented into six (6) video clusters may be weighted more favorably because DVDs typically have a menu of six (6) icons.

Alternatively, the quality of the clustering may be determined as a function of video content data. For example, a video cluster that includes video shots showing the same person, and/or showing the same scenery is weighted more favorably because it is likely that such a video cluster corresponds to one event.

Figure 5A:
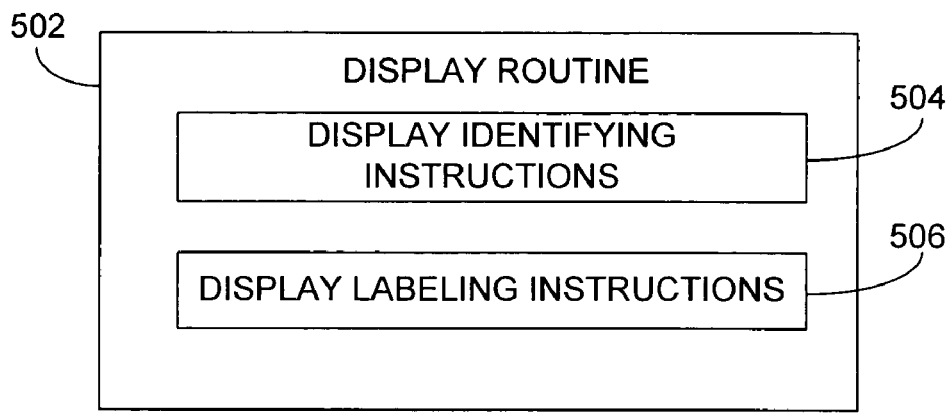
FIG. 5A is an exemplary block diagram illustrating the contents of a display routine comprising computer executable instructions for storing grouped video shots.

Referring next to FIG. 5A, an exemplary block diagram illustrates the contents of a display routine 502 having computer executable instructions for displaying video clusters.

Display identifying instructions 504 include instructions for identifying a time span of the group of video shots being displayed. In this case, the time span corresponds to the time in which the video shots within the group of video shots being displayed are recorded. As described above in reference to FIG. 4, the time span can be defined as beginning at the start time of the first recorded video shot in the group and ending at the stop time of the last recorded video shot in the group. For example, assume the video shots VS5, VS3, and VS4 listed in Table 2 above are being stored as a group video file. The time that corresponds to the start time of the first recorded video shot is 23:30:00, Dec. 31, 2001 (R1C2 in Table 2), and the stop time of the last recorded video shot is 16:10:00, Jan. 1, 2002 (R3C2 in Table 2). Thus, the time span is from Dec. 31, 2001 to Jan. 4, 2002.

Display labeling instructions 506 include instructions for determining a label for the group of video shots being displayed. The display labeling instructions 506 uniquely label each group of video shots with a time and date label that makes the particular group easily identifiable to the user when viewing. The time and date label for a group video shots is determined from the determined time span of that particular group of video shots. For example, the following list can be used to determine a label for a group of video shots.

1. If all shots in a group fall within today's date:
   If no neighboring group also has shots on today's date, the group will be labeled "Today."
   If a neighboring group has shots on the current date, then each group that is wholly contained in today's date will be named "Today—[start time of first shot in group] thru [end time of last shot in group]."
2. If all shots in a group fall within yesterday's date:
   If no neighboring group also has shots on yesterday's date, the group will be labeled "Yesterday."
   If a neighboring group has shots on yesterday's date, each group wholly contained on that date will be named "Yesterday—[start time of first shot in group] thru [end time of last shot in group]."
3. If all shots in a group fall between the current day and the most recent Sunday:
   If no neighboring group also contains shots from this week, the group will be labeled "This Week."
   If a neighboring group also has shots from this week, then each group wholly contained in this week will be named "[Day of First shot in group], this week, [Start time of first shot in group] thru [Day of last shot in group if different from first day,] [End time of last shot in group]."
4. If all shots in a group fall in the seven-day period from last Sunday to the previous Sunday:
   If no neighboring group has shots from the same period, the group will be labeled "Last Week."
   If a neighboring group has shots from the same period, then all groups wholly contained within that period will be named "[Day of first shot in group], last week, [Start time of first shot in group] thru [Day of end shot if different,] [End time of last shot in group]."
5. If all shots in a group are in the current month:
   If no neighboring groups have shots in this month, the group will be labeled "This Month."
   If a neighboring group has shots in this month, then each group wholly contained in this month will be named "This month—[Date], [Time] thru [Date if different,] [Time]."
6. If all shots in a group are in the previous month:
   If no neighboring group has shots in that month, the group will be labeled "Last Month."
   If a neighboring group has shots in that month, the group will be named "Last month—[Date], [Time]-[Date if different,] [Time]."
7. If all shots fall on a single day:
   If no neighboring group also has shots on that date, the group shall be named "[Date]."
   If a neighboring group also has shots on that date, then all groups wholly contained within that date are named "[Date], [Time]-[Time]."
8. If all shots in a group fit into a single week (a seven-day span beginning on a Sunday):
   If no neighboring group has shots from that period, the group name will be "Week of [date of beginning of week]."
   If a neighboring group has shots from that period, the group name will be "[Date], [Time] thru [Date], [Time]."
9. If all shots in a group fit into a single month:
   If no neighboring groups have shots in that month, the group name will be "[Month Name], [Year]". [Year] will either be a year number or the phrase "This Year" if the year is the current year.
   If a neighboring group has shots in that month, the group will be named "[Date], [Time] thru [Date], [Time]."
10. If the shots are in the current year (or bridging from last year to this year to catch the Christmas/New Year's groupings), the group will be named "[Beginning Date] thru [End Date]."
11. If all shots in a group fit into the previous year:
    If no neighboring groups are in the same year, the group will be named "Last Year."
    If a neighboring group has shots in the same period, the group will be named "[Date] thru [Date]."
12. If all the shots in a group fit are in a single year:
    If no neighboring groups have shots in that year, the group will be named "[Year]."
    If neighboring groups have shots in that year, the group will be named "[Date] thru [Date]."
13. Otherwise, the group will be named "[Date] thru [Date]."

Figure 5B:
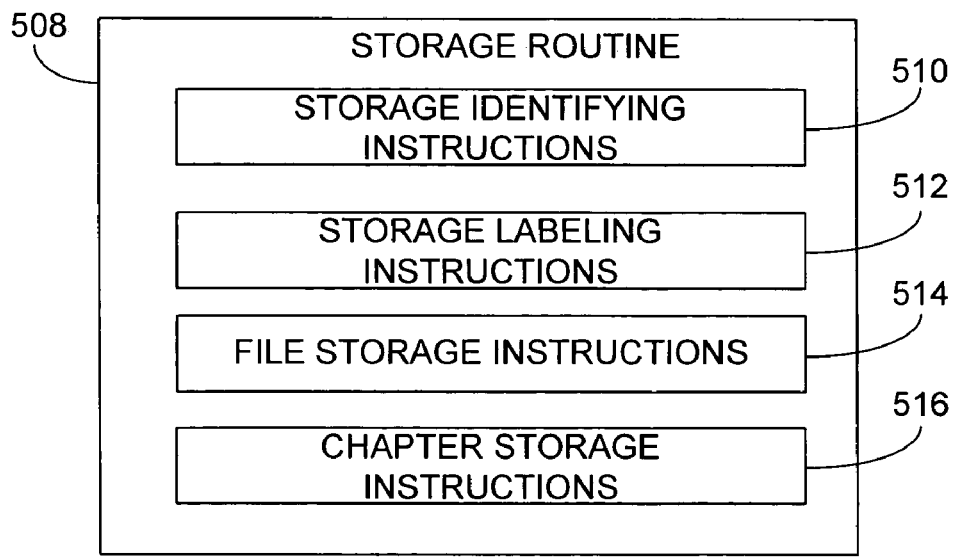
FIG. 5B is an exemplary block diagram illustrating the contents of a storage routine comprising computer executable instructions for storing grouped video shots.

Referring next to FIG. 5B, an exemplary block diagram illustrates the contents of the storage routine 508 having computer executable instructions for storing a group of video shots.

Storage identifying instructions 510 include instructions for identifying a time span of the group of video shots being stored as a grouped video shot file. As described above in reference to FIG. 5A, the time span corresponds to the time in which the video shots within the group being stored are recorded.

Storage labeling instructions 512 include instructions for determining a label for the group of video shots being stored as a grouped video shot file. The storage labeling instructions 512 uniquely labels the video shot file with a time and date label that makes the particular group easily identifiable to the user. As described above in reference to FIG. 5A, the time and date label for the group video shot file is determined from the determined time span of that particular group of video shots. The list described above in reference to FIG. 5A can be used to determine the label for the grouped video shot file.

File storage instructions 514 include instructions for storing the group of video shots as a grouped video shot file on a target CRM designated by the user. File storage instructions 514 include instructions for storing the grouped video shot file with a video title (e.g., label) showing the name and time/date information for the particular grouped video shot file (e.g., "Hawaii Vacation Jun. 24-27, 2002"). In another embodiment, file storage instructions 514 are responsive to user input for storing grouped video shot files with video subtitles and/or associated metadata. In one such embodiment, text is displayed over the existing video or inserted into the closed captioning (CC) information track available in some video formats) showing the name and time/date information for the segment. For instance, "Hawaii Vacation Jun. 24-27, 2002" might be superimposed on the video during playback as a subtitle down at the bottom of the video image using the subpicture-titling feature on a DVD-video disc. In yet another embodiment, the file storage instructions 514 are responsive to user input for storing existing grouped video shot files to a CRM as a new arrangement of the original files. For example, existing grouped video shot files can be stored in separate directories. This can be used by a user to sort a large collection of digital still images into folders with one folder for each event.

Chapter storage instructions 516 include instructions for storing the group of video shots on a removable CRM such as an optical video disc (e.g. a DVD-video disc). For, example, the chapter storage instructions 516 writes chapters to the optical video disc that correspond to a currently displayed set of video clusters or that correspond to an ideal menu structure of the optical video disc. In one embodiment, chapter storage instructions 516 are responsive to user input received via the user-interface for determining whether to write chapters to a DVD based on a currently displayed set of clusters or based on the ideal menu structure of the optical video disc.

Referring next to FIG. 6, an exemplary flow chart illustrates a method of grouping video shots of a digital video shot file for storage on a CRM. The user creates a video recording by selecting video shots from video files displayed, for example, in a collection list for grouping at 602. At 603 the user specifies a number N of video clusters in which to segment the video shots of the video recording. The segmenting routine is executed at 604. At 606 video data associated with frames of the selected shots is analyzed to determine a time of each video shot. The selected video shots are organized in chronological order based on the determined time of each shot at 608. At 610 the organized sequence of video shots is analyzed to determine time gaps between successive video shots. Pairs of successive video shots are organized in descending order based on their determined time gaps at 612. At 614 a loop count value (CV) is defined as equal to one (1). The segmenting routine segments the video recording into two video clusters by segmenting or grouping video shots on opposite sides of the largest time gap at 616. At 618 the loop count is increased by one (i.e., CV=CV+1). An initial quality value (QV) is assigned to the video recording as a function of the ratio between the gap currently being used for segmenting video shots and the next largest gap at 620. At 622 the time span (TS) of each of video clusters within the video recording is determined. The segmenting routine determines whether TS for any video cluster is less than or equal to one (1) day at 624. If TS for any video cluster is less than or equal to one day, then the QV for the segmented video recording is increased by a first amount (e.g., QV=QV+50) at 626. If TS for any video cluster is greater than one day, then the QV for the segmented video recording is unchanged at 628. At 630 the segmenting routine determines whether TS for any video cluster is less than or equal to one (1) month. If TS for any video cluster is less than or equal to one month, then the QV for the segmented video recording is increased by a second amount at 632. In this instance, the second amount is substantially less than the first amount (e.g., QV=QV+10). If TS for any video cluster is greater than one month, then the QV for the segmented video recording is unchanged at 634. At 636 the segmenting routine determines whether TS for any video cluster is less than or equal to one (1) year. If TS for any video cluster is less than or equal to one year, then the QV for the segmented video recording is increased by a third amount at 638. In this case, the third amount is equal to the second amount (i.e., QV=QV+10). If TS for any video cluster is greater than one year, then the QV for the segmented video recording is unchanged at 640. Optionally, the segmenting routine biases the QV of the video recording based on the number of clusters within the video recording (See FIG. 7) at 741. At 642 the segmenting routine determines whether or not CV is less than or equal to N. If CV is less than N, then the segmenting routine further segments the video recording into video clusters by segmenting or grouping video shots on opposite sides of the next largest time gap at 644, and determines the quality of each video cluster which begins at 618. If CV is equal to N, at 646 the segmenting routine segments the recording into the number video clusters, which results the greatest quality value for the recording. At 648 a label identifying the time span covered by each of the video clusters is determined. Each video cluster is stored on a CRM as a grouped video shots file and the determined label is assigned as the file name at 650.

Figure 7:
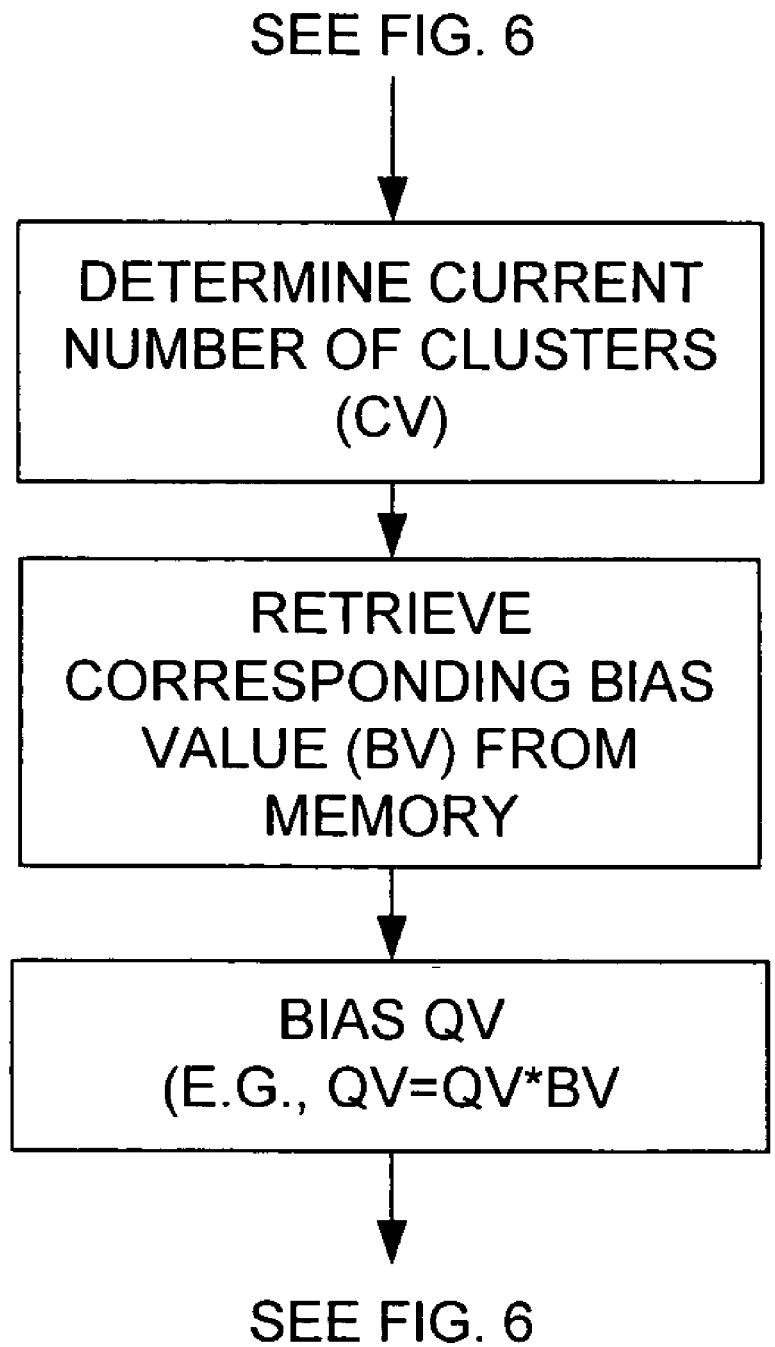
FIG. 7 is an exemplary flow chart illustrating a method for biasing video clusters toward preferred cluster counts.

Referring next to FIG. 7, an exemplary flow chart illustrates a method for biasing video clusters toward preferred cluster counts. In this example, the method for biasing video clusters is described as occurring at 641 of the flow chart illustrated in FIG. 6.

As described above in reference to FIG. 6, the initial QV assigned to the video recording is modified based on the determined time span of each of the video clusters within the video recording. (See 622-640, FIG. 6). Referring again to FIG. 7, the segmenting routine determines the current number of clusters (e.g., CV) at 702. At 704, based on the determined number of clusters, the segmenting routine retrieves a corresponding bias value (BV) stored in a memory. For example, the segmenting routine retrieves the BV from a database storing bias values indexed by the number of clusters such as shown in Table 4. At 706, the segmenting routine biases the modified QV by multiplying the modified QV, as determined between 622 and 640 of FIG. 6, by the cluster count bias value (e.g., QV=QV*BV). At 708, the segmenting routine determines whether or not CV is less than or equal to N as described in FIG. 6 at 642.

FIG. 8 shows one example of a general purpose computing device in the form of a computer 130. In one embodiment of the invention, a computer such as the computer 130 is suitable for use as the computer 202 illustrated in FIG. 2 and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer-readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules, or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer-readable medium having computer executable instructions for segmenting a plurality of video shots within one or more video files, comprising:
    determining instructions for determining a time corresponding to each video shot;
    organizing instructions for organizing the video shots in a sequence according to the determined time corresponding to each video shot;
    determining instructions for determining a time gap between two successive shots in the organized sequence; and
    segmenting instructions for grouping the video shots of the video file into a first plurality of clusters as a function of the determined time gaps; and
    wherein the segmenting instructions include instructions for:
        comparing the determined time gaps between successive video shots in the organized sequence;
        grouping two successive video shots into one of the clusters when their corresponding determined time gap indicates they are substantially close in time; and
        determining a time span of each of the first plurality of clusters, said time span corresponding to a determined time of a first in time video shot within each cluster and the determined time of a last in time video shot within each cluster.

2. The computer-readable medium of claim 1, wherein each video shot includes a video frame having video frame data, wherein the video frame data includes time and date data, and wherein the determining instructions include instructions for determining the time corresponding to each video shot from the video frame data.

3. The computer-readable medium of claim 2, wherein the determined time gap corresponds to a length of time between the determined time of a first video shot and the determined time of a subsequent video shot in the organized sequence.

4. The computer-readable medium of claim 1, wherein the organizing instructions includes instructions for organizing the video shots into a chronological order based on the determined time corresponding to each video shot.

5. The computer-readable medium of claim 1, wherein the segmenting instructions includes instructions for comparing the determined time span of each of the first plurality of clusters to a date boundary (e.g., day, week, month, or year), and wherein the first plurality of clusters is assigned a first quality as a function of the comparison.

6. The computer-readable medium of claim 5, wherein the first plurality of clusters is assigned a favorable quality when the determined time span of each of clusters is less than or equal to the date boundary.

7. The computer-readable medium of claim 6, wherein the segmenting instructions include instructions for biasing the first quality as a function of a number of clusters in the first plurality of clusters, and wherein a favorable bias is applied to the first quality to calculate a first biased quality when the number of clusters in the first plurality of clusters is less than or equal to a predefined cluster count, and wherein a less favorable bias is applied to the second quality to determine the first biased quality when the number of clusters in the second plurality of clusters is greater than the predefined cluster count.

8. The computer-readable medium of claim 7, wherein the segmenting instructions includes instructions for grouping the video shots of the video file into a second plurality of clusters as a function of the determined time gaps, and wherein the segmenting instructions includes instructions for determining a time span of each of the second plurality of clusters, wherein the time span corresponds to a determined time of a first in time video shot within each cluster and the determined time of a last in time video shot within each cluster, and wherein the segmenting instructions includes instructions for comparing the determined time span of each of the second plurality of clusters to a date boundary (e.g., day, week, month, or year), and wherein the second plurality of clusters is assigned a second quality as a function of the comparison.

9. The computer-readable medium of claim 8, wherein the segmenting instructions include instructions for biasing the second quality as a function of a number of clusters in the second plurality of clusters, and wherein the favorable bias is applied to the second quality to determine a second biased quality when the number of clusters in the second plurality of clusters is less than or equal to the predefined cluster count, and wherein the less favorable bias is applied to the second quality to determine the second biased quality when the number of clusters in the second plurality of clusters is greater than the predefined cluster count.

10. The computer readable medium of claim 9, wherein the segmenting instructions further includes instructions for comparing the first biased quality and the second biased quality and grouping the video shots as a function of the comparison.

11. The computer-readable medium of claim 8, wherein the segmenting instructions further includes instructions for comparing the first quality and the second quality and grouping the video shots as a function of the comparison.

12. A computer-readable medium having computer executable instructions for storing a group of video shots, comprising:
   storage identifying instructions for identifying a time span corresponding to the group of video shots;
   storage labeling instructions for determining a label for the group of video shots corresponding to the identified time span corresponding to the group of video shots; and
   storage instructions for storing the group of video shots as a grouped video shot file; and
   wherein the time span corresponds to a determined time of a first shot within the group of video shots and the determined time of a last video shot within the group of video shots.

13. The computer-readable medium of claim 12, wherein the storage instructions include instructions for assigning the determined label as a name of a file to be stored on the computer-readable medium.

14. The computer-readable medium of claim 12, wherein each video shot includes a video frame having video frame data, wherein the video frame data includes time and date data, and wherein the storage identifying instructions include instructions for determining the time corresponding to each video shot from the video frame data.

15. The computer-readable medium of claim 14, wherein the storage instructions includes instructions for organizing the video shots into a chronological order based on the determined time corresponding to each video shot.

16. A method for segmenting a plurality of video shots within a video file for storage on a computer-readable medium:
   determining a time corresponding to each video shot;
   organizing the video shots in a sequence according to the determined time corresponding to each video shot;
   determining time gaps between two successive shots in the organized sequence;
   first grouping the video shots into a first plurality of clusters as a function of the determined time gaps;
   assigning a first quality to the a first plurality of clusters as a function of a time span of each cluster in the first plurality of clusters;
   second grouping the video shots into a second plurality of clusters as a function of the determined time gaps;
   assigning a second quality to the second plurality of clusters as a function of a time span of each cluster in the second plurality of clusters;
   comparing the first and second quality and selecting the first or second grouping as a function of the comparison; and
   storing the selected grouping as a file on the computer-readable medium.

17. The method of claim 16, wherein the determining a time of each video shot includes analyzing video data associated with a video frame to determine a start time of the video shot and end time of the video shot, wherein each video shot includes one or more video frames, and wherein said video data includes time and date data.

18. The method of claim 16, wherein the organizing the video shots includes organizing the video shots in a chronological order.

19. The method of claim 16, wherein the determining a time gap includes determining a time difference between the determined time of a first video shot in the organized sequence and the determined time of a subsequent video shot in the organized sequence.

20. The method of the claim 16, wherein the assigning a first quality to the first plurality of clusters includes comparing the determined time span of each cluster in the first plurality of clusters to a date boundary (e.g., day, week, month, or year) to determine whether the determined time span is less than or equal to the date boundary, and wherein assigning a second quality to the second plurality of clusters includes comparing the determined time span of each cluster in the second plurality of clusters to a date boundary (e.g., day, week, month, or year) to determine whether the determined time span is less than or equal to the date boundary.

21. The method of the claim 20, wherein the comparing the first and second quality includes determining whether the assigned first quality is more favorable than the assigned second quality, or whether the assigned first quality is less favorable than the assigned second quality, wherein the selecting the first or second grouping includes selecting the first plurality of clusters when the assigned first quality is more favorable than the assigned second quality, and wherein the selecting the first or second grouping includes selecting the second plurality of clusters when the assigned first quality is less favorable than the assigned second quality.

22. The method of claim 20, wherein the determining the first biased quality includes applying a favorable bias to the first quality when the number of clusters in the first plurality of clusters is less than or equal to a predefined cluster count, and applying a less favorable bias to the first quality when the number of clusters in the first plurality of clusters is greater than the predefined cluster count, and wherein the determining the second biased quality includes applying the favorable bias to the second quality when the number of clusters in the second plurality of clusters is less than or equal to a predefined cluster count, and applying the less favorable bias to the first quality when the number of clusters in the second plurality of clusters is greater than the predefined cluster count.

23. The method of the claim 16 further including biasing the first quality assigned to the first plurality of clusters as a function of a number of cluster in the first plurality of clusters and biasing the second quality assigned to the second plurality of clusters as a function of a number of cluster in the second plurality of clusters, wherein the biasing the first quality includes determining a first biased quality, and wherein the biasing the second quality includes determining a first biased quality, and wherein the comparing further includes comparing the first biased quality and second biased quality and selecting the first or second grouping as a function of the comparison.

24. The method of the claim 16 further including determining a label for each of the clusters in the selected grouping that identifies the time span corresponding to the group of video shots grouped into each cluster, and assigning the determined label as a name of the file to be stored on the computer-readable medium.

25. A computer-readable medium having computer executable instructions for storing a group of video shots, comprising:
    storage identifying instructions for identifying a time span corresponding to the group of video shots;
    storage labeling instructions for determining a label for the group of video shots corresponding to the identified time span corresponding to the group of video shots; and
    storage instructions for storing the group of video shots as a grouped video shot file; and
    wherein the label indicates a date boundary, and wherein the time span corresponding to the group of video shots is less than or equal to the date boundary.

26. The computer-readable medium of claim 25, wherein storage instructions includes chapter storage instructions for storing the group of video shots on a removable computer-readable medium such as an optical video disc.

27. The computer-readable medium of claim 25, wherein the storage instructions include instructions for assigning the determined label as a name of a file to be stored on the computer-readable medium.

28. The computer-readable medium of claim 25, wherein each video shot includes a video frame having video frame data, wherein the video frame data includes time and date data, and wherein the storage identifying instructions include instructions for determining the time corresponding to each video shot from the video frame data.

29. The computer-readable medium of claim 28, wherein the storage instructions includes instructions for organizing the video shots into a chronological order based on the determined time corresponding to each video shot.

30. The computer-readable medium of claim 29, wherein the storage identifying instructions include instructions for determining a time difference between the determined time of a first video shot in the organized sequence and the determined time of a subsequent video shot in the organized sequence.

31. A computer-readable medium having computer executable instructions for storing a group of video shots, comprising:
    storage identifying instructions for identifying a time span corresponding to the group of video shots;
    storage labeling instructions for determining a label for the group of video shots corresponding to the identified time span corresponding to the group of video shots; and
    storage instructions for storing the group of video shots as a grouped video shot file; and
    wherein storage instructions includes chapter storage instructions for storing the group of video shots on a removable computer-readable medium.

32. The computer-readable medium of claim 31, wherein the storage instructions include instructions for assigning the determined label as a name of a file to be stored on the computer-readable medium.

33. The computer-readable medium of claim 31, wherein each video shot includes a video frame having video frame data, wherein the video frame data includes time and date data, and wherein the storage identifying instructions include instructions for determining the time corresponding to each video shot from the video frame data.

34. The computer-readable medium of claim 33, wherein the storage instructions includes instructions for organizing the video shots into a chronological order based on the determined time corresponding to each video shot.

35. The computer-readable medium of claim 34, wherein the storage identifying instructions include instructions for determining a time difference between the determined time of a first video shot in the organized sequence and the determined time of a subsequent video shot in the organized sequence.

36. The computer-readable medium of claim 31, wherein the label indicates a date boundary, and wherein the time span corresponding to the group of video shots is less than or equal to the date boundary.

* * * * *